Aug. 16, 1938.   A. A. KRAMER   2,126,997
METHOD OF MAKING STORAGE TANKS AND SIMILAR WELDED STRUCTURES
Original Filed March 30, 1934   3 Sheets-Sheet 1
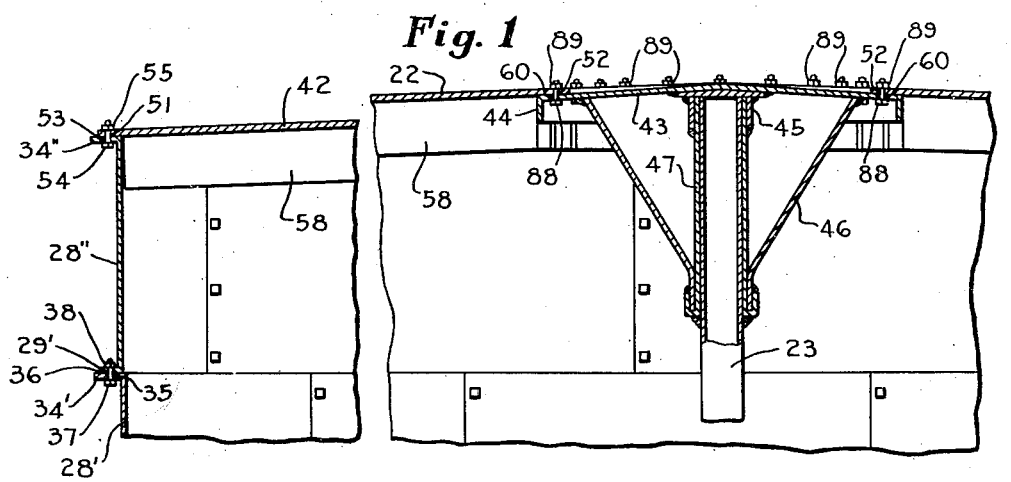
Fig. 1
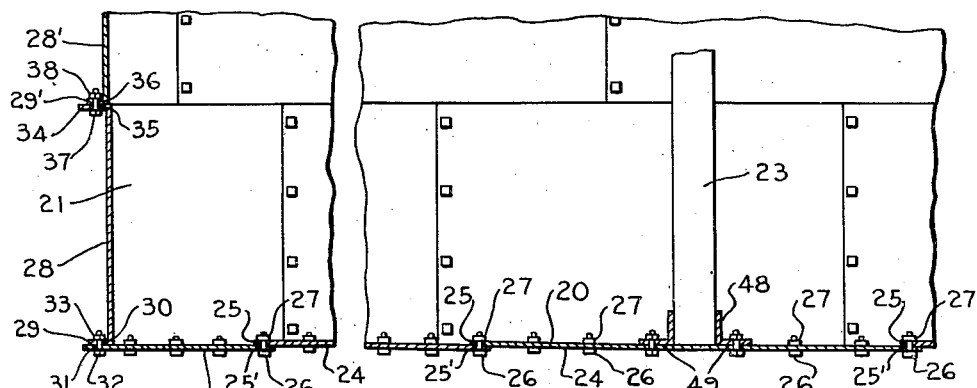
Fig. 2
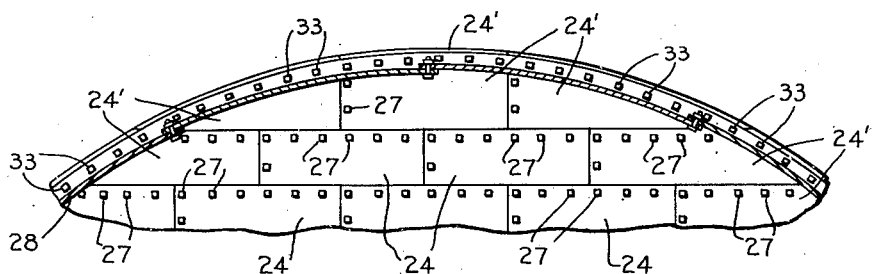
INVENTOR
ANDREW A. KRAMER
BY Alfred R. Fuchs
ATTORNEY Aug. 16, 1938.   A. A. KRAMER   2,126,997
METHOD OF MAKING STORAGE TANKS AND SIMILAR WELDED STRUCTURES
Original Filed March 30, 1934   3 Sheets-Sheet 2
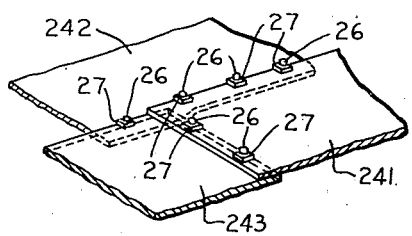
Fig. 3
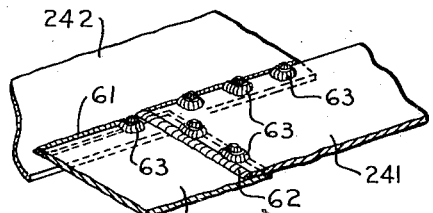
Fig. 5
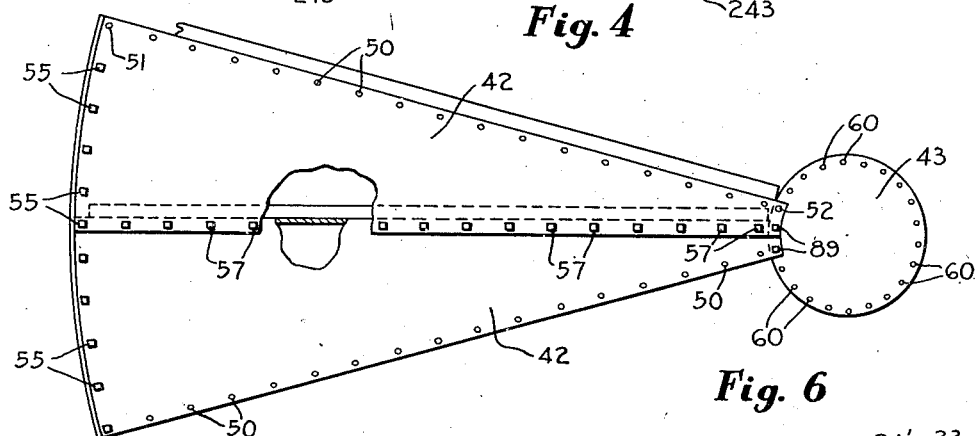
Fig. 4
Fig. 6
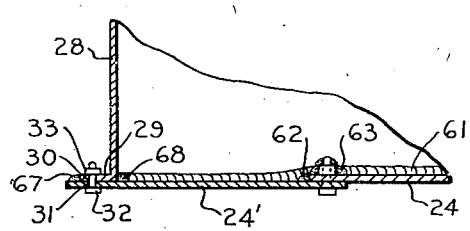
Fig. 7
Fig. 9
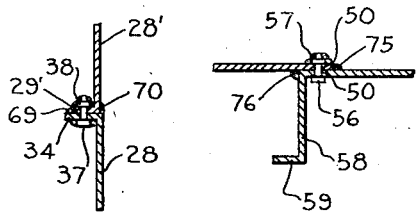
Fig. 8   Fig. 10   Fig. 11
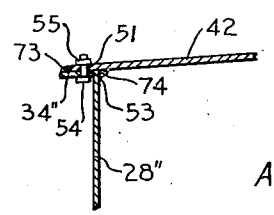
INVENTOR
ANDREW A. KRAMER
BY Alfred R. Fuchs
ATTORNEY Aug. 16, 1938.　　　　A. A. KRAMER　　　　2,126,997
METHOD OF MAKING STORAGE TANKS AND SIMILAR WELDED STRUCTURES
Original Filed March 30, 1934　　　3 Sheets-Sheet 3
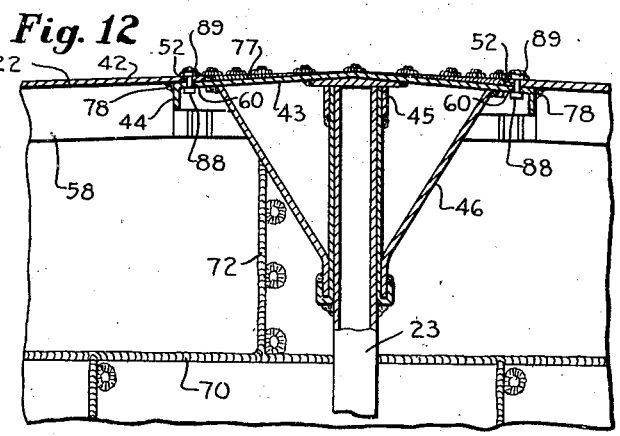
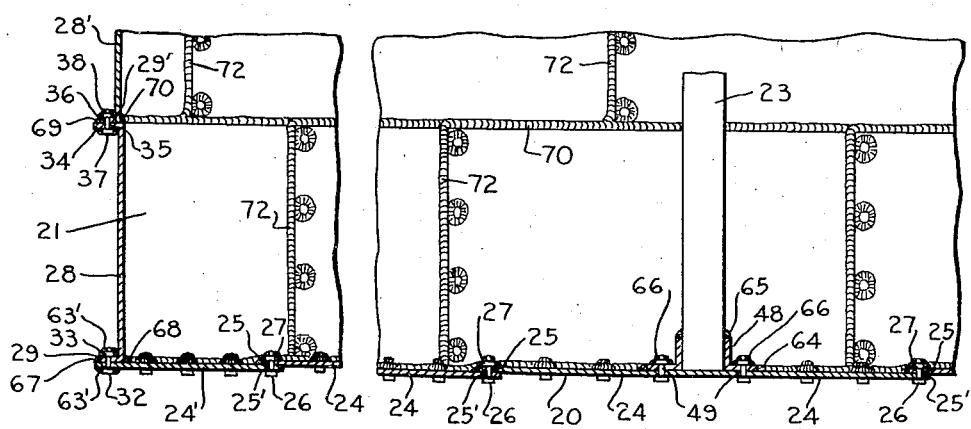
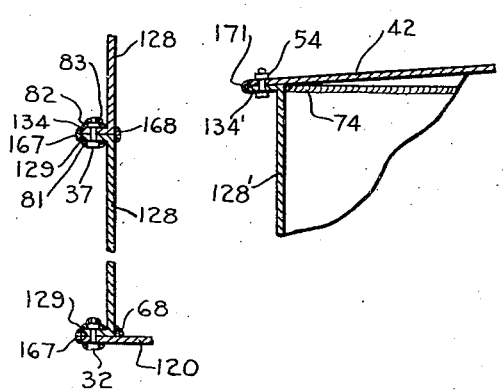
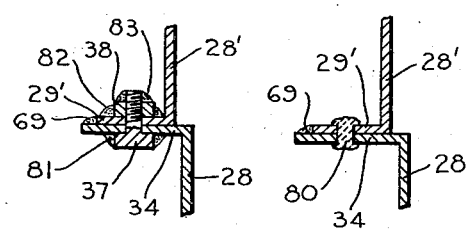
INVENTOR
ANDREW A. KRAMER
BY *Alfred R. Fuchs*
ATTORNEY Patented Aug. 16, 1938

2,126,997

UNITED STATES PATENT OFFICE 2,126,997

METHOD OF MAKING STORAGE TANKS AND SIMILAR WELDED STRUCTURES

Andrew A. Kramer, Kansas City, Mo.

Original application March 30, 1934, Serial No. 718,219. Divided and this application March 19, 1937, Serial No. 131,878

8 Claims. (Cl. 113—120)

My invention relates to the method of constructing welded sheet metal structures, and more particularly to the method of constructing sheet metal storage tanks, this application being a division of my application Serial No. 718,219, filed March 30, 1934.

It is the important purpose of my invention to provide a new and improved method of building a welded tank that comprises cutting, punching and fitting the sheets at the place of fabrication for quick assembly into a tank at the place of erection, and to so form the sections, or sheets, comprising the tank that the same can be quickly erected into a tank so as to be firmly secured together without welding any of the joints or seams between the sheets or sections, then fixedly securing said sections or sheets together at the place of erection by suitable securing means, the bottom, side walls and roof, or deck, of the tank being erected in this manner, the sections of the bottom being first secured together, the side walls being built up from said bottom, and the roof, or deck, being mounted in position on the side walls, and suitably centrally supported, and the sections thereof firmly secured together, and then after the complete tank has been thus assembled at the place of erection, the welding of the bottom, the sides and the roof can be proceeded with in any order desired, the complete welding operation being performed without any interruption inasmuch as all the parts that are to be welded together are placed in their proper positions and held there in fixed position before any welding is begun. This saves much time and labor and proves to be a great economy in the building of such tanks.

The securing means, that are provided for holding the sections, or sheets, comprising the tank together prior to welding, may be left in place, if desired, or may be removed, and, if desired, the sheets may be welded together at the openings for the securing means after removal thereof.

Many advantages result from my improved new tank constructing method. Thus, by the improved method of constructing the bottom of my tank, hinging of the plates, or sheets, forming said bottom, relative to each other is entirely prevented. Also the complete tank can be set up without first tack-welding the bottom of the tank from underneath. It is not necessary, if the bolts or other securing means are retained in place after the welding operation has been completed, to weld the under side of the bottom of the tank at the seams or joints at all. This makes it unnecessary to raise the bottom of the tank off the ground a substantial distance, as is necessary when such welding must be done on the underneath side of the bottom.

The method of connecting the bottom of the tank to the side wall of the tank, whereby the bottom is caught so as to hold the same while welding the side wall and bottom to each other, not only does this, but also holds the seam close together for welding and forms a reinforcing chime for the bottom and the shell or side wall of the tank at the junction of said bottom and side wall.

In the preferred construction, the side walls of the tank are provided with flange sheets and the flanges of the sheets are bolted together, or held together by any other suitable securing means, prior to welding, which not only has the advantage of providing a quick method of assembling the side wall portion of the tank, but the annular side seams formed when the seams or joints have been welded, stiffen the tank and hold it round and reinforce the seams against wind pressure. My improved side wall can be welded either inside or outside the tank, or both.

My improved method of constructing a tank also has substantially the same advantages in constructing the roof, or deck, as to quick assembly and the provision of a better weld than would otherwise be possible, and furthermore my improved method eliminates the necessity of a reinforcing angle iron around the top of the side wall of the tank, where said side wall joins said roof, or deck, this being particularly so in a tank of large size.

Other objects and advantages of my invention will appear as the description of the drawings proceeds. I desire to have it understood, however, that I do not intend to limit myself to the particular details shown or described, except as defined in the claims.

In the drawings:

Fig. 1 is a vertical transverse sectional view partly broken away, through the improved tank forming the subject matter of my invention, completely erected ready for welding.

Fig. 2 is a fragmentary view partly in horizontal section and partly in plan of the tank shown in Fig. 1, the section being taken near the bottom.

Fig. 3 is a fragmentary view in perspective of a plurality of bottom sheets showing the overlapping arrangement thereof.

Fig. 4 is a fragmentary top plan view of the deck portion of the tank, partly broken away, showing a pair of the deck sections in place.

Fig. 5 is a view similar to Fig. 3, showing the seams welded in the bottom.

Fig. 6 is a fragmentary view partly in horizontal section and partly in plan, showing the bottom seams welded and the seams joining the bottom with the bottom row of side sections welded.

Fig. 7 is a fragmentary vertical sectional view through the peripheral portion of the bottom and the lower end portion of the side wall after the welding of the joints between said bottom sections, and between the bottom sections and side wall sections has been completed.

Fig. 8 is a fragmentary view in vertical section, showing one form of welded joint between adjoining rings, or horizontal rows, of the side wall sections.

Fig. 9 is a fragmentary horizontal sectional view, showing the vertical seam between two adjacent side wall sections in one such ring after welding thereof has been completed.

Fig. 10 is a fragmentary vertical sectional view through the deck, showing one of the radial seams after being welded.

Fig. 11 is a fragmentary vertical sectional view through the deck and upper part of the wall portion at the joint between said side wall portion and deck, showing the same after being welded.

Fig. 12 is a view similar to Fig. 1, showing the completed tank with all the joints welded therein.

Fig. 13 is a view similar to Fig. 8, showing a modification of the horizontal joint between the side wall sections and the joint between the bottom and side wall.

Fig. 14 is a view similar to Fig. 11, showing a modification.

Fig. 15 is a view similar to Fig. 8, of a further modification, and

Fig. 16 is a view similar to Fig. 8 of a still further modification.

Referring in detail to the drawings, my improved storage tank is shown in Fig. 1 as comprising a bottom 20, a side wall 21 and a roof, or deck, 22 supported by the side wall and by a central supporting member mounted on a post 23. The various sections, or sheets, of which the tank is made up, are cut to the proper shape and bent to the shape required, where such bending is necessary, and punched with suitable openings for receiving bolts at the place of fabrication, and these sheet metal sections, or sheets, are then assembled, fixedly bolted together, and welded together at the place of erection.

Referring to Figs. 1, 2 and 3 it will be seen that the bottom 20 is made up of a plurality of sheets, or sections, 24, that are generally rectangular in shape, and other sections, or sheets, 24' that have a curved edge portion so as to form the curved outline of the periphery of the bottom adjacent the side wall of the tank. The sections 24 are provided with openings 25 that align with similar openings 25' in either a section, or sheet, 24 or 24', as the case may be, when the sheets are arranged in overlapping relation, as shown in Fig. 3. The sheets, or sections, forming the bottom, overlap both at their longitudinal and transverse edges, with the openings in said overlapping sheets aligning. In the erection of the bottom, the sheets, or sections, 24 and 24' are arranged in proper relationship to form said bottom, and fastening elements, such as the bolts 26, are inserted in the aligning openings of the overlapping sheets from the underneath side of said bottom, and nuts 27 are tightened down on the bolts to firmly secure said overlapping sheets together.

Some of the joints of the bottom are shown in cross section in Fig. 1, while Fig. 3 a fragmentary view, partly in section and partly in perspective, shows the manner in which the joints of the bottom are arranged. Thus the sections 241 and 243 are shown as overlapping the section 242 longitudinally, while the section 241 overlaps the section 243 transversely. The fastening elements 26 extend through the aligning openings in the sheets 241 and 242, as well as through the aligning openings in the sheets 242 and 243 and the aligning openings in the sheets 241 and 243, firmly clamping all the sections of the bottom together in fixed relation. The bottom is completely assembled in this manner, and after this has been done the side wall is built up, beginning with the connection between the bottom row of side wall forming members and the bottom.

It will be noted upon reference to Figs. 1 and 7 that the peripheral sections 24' of said bottom extend outwardly beyond the vertical portion of the side wall forming member 28, and that each side wall section 28 has a laterally extending flange 29 thereon, which extends in face to face relation to the curved peripheral edge of the bottom forming section 24', with which it may be associated, with the opening 30 in said flange aligning with the openings 31 in said section 24'. Fastening elements 32 are extended from the bottom upwardly through the openings 31 and 30 that are in alignment when these sections are in assembled relation to each other, and the nuts 33 are applied thereto to firmly secure the bottom row of side wall forming sheets 28 to the periphery of the bottom of the tank.

The spacing of the openings in the sheets 24, 24' and 28 is such that sufficient securing elements can be used to connect the various sections to each other, in the manner described above, so that the same will be fixed in position and will be supported sufficiently that the structure will stand up indefinitely, under all but the most unusual conditions, in an empty condition, so that welding of the seams can be done at any time desired after the complete erection of the tank, by use of the detachable securing elements, such as the bolts previously described, has been completed. The side wall forming sheets, or sections, 28 are, preferably, provided not only with the flange 29, but with a corresponding flange 34 along the opposite edge thereof, as shown in Fig. 1. The sections 28 are, preferably, curved to the curvature that the wall is to have when the tank is completed. The sections, or sheets, 28' of the next higher row, and of all the intermediate rows are of similar shape. The sections, or sheets, 28' each have flanges 29' and 34' thereon, corresponding to the flanges 29 and 34 on the sections 28.

In the form of the invention shown in Figs. 6, 7, 8 and 12 the flanges 29' are shorter than the flanges 34 and 34', and the sections 28 and 28' are arranged in the manner shown clearly in Fig. 8 with the inner face of the section 28' spaced slightly outwardly beyond the inner face of the section 28 so as to provide a small ledge at the joint between said sections 28 and 28'. Also the flange 34 extends outwardly a short distance beyond the outer edge of the flange 29'. This is, of course, accomplished by the location of the holes 35 and 36 in the flanges 34' and 29', respectively, which align and which receive the bolt-like fastening elements 37 having the nuts 38 provided thereon. Each horizontal seam, or joint, of the side wall is made in the manner shown in Fig. 8, with the upper flange at each joint related to the lower flange at each joint in the manner shown in said figure. The purpose of this will be described below. Each row or ring of side wall sections is in this manner held in firm fixed relationship on the next lower row of side wall sections.

The adjoining ends of the sections 28 or 28', of any one of the circumferential rows of sections, are provided with overlapping joints with bolt openings provided therein that align, said joints being shown in Figs. 2, 6 and 9, said sections 28 having the aligning openings 39 through which the bolt-like fastening elements 40 are passed, and the nuts 41 screwed thereon to secure the vertical seams together in firm, fixed relationship, the fastening elements in the vertical and horizontal seams being used in sufficient number and in sufficiently closely spaced relation, to hold the side wall erect under all but the most unusual conditions, for such a length of time, with the tank empty, of course, that the welding of the side wall portions of the tank and the bottom, can all be proceeded with at the same time whenever this may be convenient. The top row of sections 28'' is made in a similar manner to the previously described sections 28 and 28', but if desired, the upper flange portion on each section 28' may be bent at a slightly oblique angle, this being indicated at 34'' in Figs. 1, 11 and 12, so that the deck sections will fit flat-wise thereon, the pitch of the deck, or roof, being taken into consideration.

The deck, or roof portion, of the tank is shown as being made up of a plurality of sections 42, which are shown as being segmental in character, and have the radial edges of adjoining sections overlapping, while the outer peripheral edges overlap the flange formed, collectively, by the flanges 34'' of the sections 28'', and the inner ends or edge portions thereof overlap the central supporting member 43, said central supporting member being made of any desired shape, but being shown as being a slightly cone shaped plate-like member 43 with a peripheral flange 44, which is supported by means of the post-like member 23 entering a socket portion 45 at the center thereof, and having conical bracing means 46 secured to the sleeve 47 surrounding said post-like member 23, and to the top plate 43. The parts forming this central support may all be welded together, and in turn, welded to the post 23 before erection at the place of fabrication, the post 23 being mounted on the bottom 20 in a flanged sleeve 48, which is bolted to said bottom, as indicated at 49.

In the erection of this central support it is not necessary that the post 23 be welded to the central supporting unit until the other welding is done, but ordinarily the parts of this central supporting unit are all welded together at the place of fabrication and all that is necessary in the erection of the tank is to bolt the flanged sleeve 48 in position on the bottom, which is, preferably, done at the time the bottom is being assembled, then insert the bottom end of the post 23 into the socket formed by the sleeve 48 and place the central supporting unit on the top end of the post-like member 23 before placing the sections 42 in position. Then the sections 42 are placed in position on the side wall and central support and fastened thereto. The sections 42 are provided with rows of bolt receiving openings 50 along the radial edges thereof, and with bolt receiving openings 51 adjacent the outer peripheral edge thereof, as well as bolt receiving openings 52 at the inner ends thereof. The bolt receiving openings 51 align with bolt receiving openings 53, in the flanges 34'' and bolts 54 are passed therethrough, and the nuts 55 cooperating therewith firmly secure the roof, or deck sections, 42 to the side wall portion 21 in fixed relation by securement to the flanges 34''. The overlapping radial edges of the sections 42 have the bolt receiving openings 50 therein aligning with each other when the roof, or deck, is assembled and the bolt-like members 56 provided with the nuts 57 are passed therethrough to secure the adjoining deck sections 42 firmly to each other in fixed face to face relation at said joints.

If desired, a stiffening flange, or web portion, 58 may be provided on one section 42 at each radial joint to form radial, beam-like members under said roof integral with the roof, and this web portion may be provided with a lateral bottom flange 59 to further stiffen this beam-like member at each radial joint in the roof, or deck. The deck sections 42 are further secured to the central supporting member 43 by passing the bolt-like members 88 through the openings 52 and the aligning openings 60 in the central supporting member 43, the bolts in combination with the nuts 89 firmly clamping said roof sections 42 to the central supporting member 43.

The tank is thus completely erected and the sections thereof secured together in fixed relation by the detachable securing means shown as being in the form of bolt-like members, and will stand up in such erected condition until it is desirable to proceed with the welding of the various joints in the tank structure.

The welding may be proceeded with from any desired point and in any desired manner. It would probably be the customary procedure, however, to proceed with welding the bottom first. All of the joints of the bottom are welded at the points where the edges of the overlapping sheets overlie the underlapping sheets, the longitudinal welds being indicated at 61 in Figs. 5, 6 and 7, and the transverse welds at 62. In the case of the bottom the bolts 26 and nuts 27 are welded in place, a weld 63 being provided around each bolt and nut. Thus the bottom is made liquid-tight, without any gasket or packing at any of the joints, all sheets being welded in liquid-tight relation to the sheets with which the same are in engagement. Of course, the flange 48 is welded at 64 to the section, or sections, 24, upon which it is mounted, and the central post-like member 23 may also be welded at 65 to said flange, or flanged sleeve, 48. Also the bolt-like members 49 and the nuts provided thereon are welded at 66 to the flanged sleeve 48 so as to provide a liquid-tight joint between the bolts and nuts and the flanged sleeve, and between the flanged sleeve and the bottom of the tank. The use of the bolts 26 in securing the bottom sheets together, prior to welding avoids the necessity of blocking up the bottom to weld it, which requires raising the same to a high level and makes the lowering of the same to its final position a dangerous operation. Also frequent serious accidents result when a tank bottom slips relative to the supports under it when so blocked up, while welders are working under the same. The use of the bolts furthermore prevents any tendency of the sheets to hinge relative to each other at the joints after the tank is in use, there being two points of securement of the sheets to each other at the seams, in spaced relation to each other, thus preventing any such hinging.

The sections 24' of the bottom are welded to the flanges 29 on the side wall forming sections 28 by a continuous liquid-tight weld 67 on the outside of the tank, and a similar continuous weld 68 may be provided, if desired, on the inside of the tank. The forming of the weld at the outside of the tank is facilitated by making the flange 29 shorter than the projecting portion of the bottom section 24' to which it is welded, thus leaving a corner in which a fillet-like weld can be made. Of course, a similar corner exists at the weld 68. The use of the bolts 26 and of the bolts 32 causes a very close fixed face to face engagement of the sections 24 and 24' with each other, and of the flanges 29 on the sections 28 and the sections 24' with each other, at the point of welding, and thus makes it possible to provide a neater and tighter weld than would be otherwise the case.

If desired, the bolt-like members 32 can be left in place, or can be removed after this welding has been completed. If the inner weld 68 is provided, the removal of the bolt-like members 32 does not require any further welding operation. The use of the bolt-like members 32, if no weld 68 is made, serves to prevent hinging of the bottom and side wall members relative to each other, in addition to serving as a temporary securing means, and in that case the bolt-like members 32 must be left in position to serve this purpose. If the bolt-like members 32 are left in position, and no weld 68 is provided, these must be welded around their heads and around the nuts 33 to prevent any leakage, as indicated at 63'. If the bolt-like members 32 are removed and no weld 68 is provided, it is necessary that the bolt openings 30 and 31 be welded shut to avoid any possibility of leakage, this being even desirable where a weld 68 is provided, to make sure that the joint is liquid-tight. Either operation is easily carried out without raising up the tank bottom, as the bolts are closely adjacent the outer edge of said bottom.

In welding up the side wall 21 the horizontal seams are welded, preferably, as shown in Fig. 8, there being a continuous external weld at 69, and a continuous internal weld at 70. After the welds 69 and 70 have been made the bolt-like members 37 can be removed, and if preferred, the holes welded shut, as shown at 80 in Fig. 16, or the bolt-like members 37 can be left in place and a weld 81 made around the head of the bolt and a weld 82 around the base of the nut 38, and the nut 38 welded at 83 to the bolt 37, as shown in Fig. 15, to provide a liquid-tight joint between the flanges 29' and 34 at said bolts. This welding of the bolts in place is not absolutely necessary where an internal weld 70 is provided, although it is obvious that if the weld 70 is omitted, as shown in Figs. 15 and 16, this would be necessary. All the horizontal seams are welded in the same manner as the seam described.

The vertical seams in the side wall portion are made in the manner shown in Fig. 9, all the vertical seams being made in the same manner. The vertical seams are, preferably, welded externally at 71 and internally at 72, the welds running from one of the horizontal seams to the next horizontal seam and being made liquid-tight. Said welds join the edge portions of the overlapping sheets with the body portions of the cooperating sheets at a point spaced from the edges thereof. The bolt-like members 40 can be removed after these welds have been made, but in this case it is a necessity that the openings provided for the bolts be welded shut if the bolts are removed, while, if the bolts remain in place a weld must be made around the head of the bolt on the inside of the tank, and a weld is also, preferably, made around the bolt and nut on the outside of the tank, as shown in Fig. 9 at 81, 82 and 83.

The peripheral edge portion of the roof 22 and the side wall 21 are welded together by continuous circumferential internal and external welds, indicated at 73 and 74 in Figs. 11 and 12. If the internal weld 74 is provided, as well as the external weld 73, the bolts 54 can be removed, if desired, after the welding has been completed without doing any more welding on the joint, or, if preferred, the bolt holes through which the bolts 54 were extended, can be welded shut. Also the bolts can be left in position just as they were prior to welding, or, if preferred, a weld can be made around each bolt head, around each nut and at the point where the nut embraces the bolt on the upper side of the joint.

The radial joints between the deck sections 42 are also welded, an external weld 75 and an internal weld 76 being provided, running the entire length of the joint, as shown in Fig. 10, and in order to prevent escape of gases around the bolts 56, it is necessary, if the bolts 56 are not removed, to weld around the bolts and nuts in the manner previously described in connection with the bolts and nuts previously mentioned, such as those in the side wall of the tank, or to at least weld either the heads of the bolts in fluid-tight relation to the deck sections or the nuts and bolts in fluid-tight relation on the top side of the deck, or if the bolts 56 are removed, to weld shut the openings through which said bolts had been passed. The same is true of the bolts that connect the inner ends of the sections 42 with the central supporting member 43. If these are left in place, welds are made around the bolts and nuts to prevent any leakage at this point, and if they are removed the holes are welded shut. A continuous external weld 77 is provided at the inner edges of the sections 42, joining the sections 42 with the central supporting member 43, and an internal weld 78 may be provided between said sections 42 and the flange 44 on the member 43, the securing members being, of course, left in place until these welds have been made. The securing members used at all of the joints, serve to firmly clamp the parts together in fixed position for welding, and provide for a better and neater weld than if the sheets are not clamped as firmly together face to face in fixed relation as can be done by my improved method of building a tank. The securing elements, if left in place, further add to the strength of the joint at all points where the same are used, and are not harmful to the structure in any respect. It is only a question as to which would prove the most economical, as to whether the bolts are to be removed and re-used in the erection of another tank, or left in place on the tank on which the same were orginally used.

It will be noted that, with the stepped arrangement of the joints in the side wall of the tank shown in Figs. 1 and 8, each circumferential joint has an offset therein on the inner face and on the outer face of the tank to provide a recess in which the weld is made. Also a similar recess is provided in the corner between the circumferential edges of the roof sections and the flanges of the top-most sections of the side wall, and between the circumferential edges of the bottom flanges of the bottom-most row of side wall sections and in the laterally extending portion of the bottom of the tank on the outside thereof. In Fig. 13 a modified form of side wall seam is shown, in which there is no such a stepped arrangement at the joint. Also in Fig. 13 the flanges 129 on the bottom-most sections 128 of the side wall of the tank are shown as terminating with their outer edges in alignment with the outer circumferential edge of the bottom 120 of the tank, a weld 167 being provided at said outer edges of the flange and bottom, respectively, the bolts 32 being utilized in the same manner as was previously the case and the weld 68 being provided in the same manner as was described in connection with the form of the invention shown in Figs. 1 to 12, inclusive. The flanges 129 and 134 at each of the circumferentially extending seams are made in the same manner, each having an external weld 167 at the peripheral edge portions of the flanges 129 and 134, which are made the same depth on both edges of all the sheets, or sections, comprising said side wall, and a weld 168 may be provided on the inner side of each joint, the adjacent surfaces of the sheets at the bases of the flanges being welded together by means of this weld.

In the form of the invention shown in Fig. 14, the upper-most sections 128' may be made slightly different than the other sections, by slightly inclining the upper-most flange 134' so as to correspond to the pitch of the deck sections 42, which are the same as previously described. The flanges 134' extend only as far laterally, however, as the circumferential edge portions of the deck, or roof, sections 42 and the weld 171 is provided between these edge portions in the same manner as the welds 167 previously described. The weld 74 on the inside of the seam is the same as described in connection with Figs. 1 to 12, inclusive. The bolts 37 and 54 are used in the same manner as were these bolts in the form of the invention previously described and serve the same purpose. The bolts may be removed, the holes for the bolts welded shut, or the bolts and nuts welded in place, in this form of the invention just as could be done in the form of the invention previously described.

I claim:—

1. The method of making a tank of sheet metal sections comprising assembling the bottom thereof and securing the sections comprising said bottom together with sufficient securing elements to hold said sections in assembled substantially fixed relation, building up the side wall portion thereof by substantially fixedly securing the sheet metal sections comprising said side wall portion to said bottom and to each other with sufficient securing elements to hold said wall in upright position and said sections in substantially fixed relation to each other, securing sections of the roof to a central support, to the top of said side wall portion and to each other with sufficient securing elements to hold said roof in position on said tank in substantially fixed relation to said side wall portion and the sections thereof to each other, and welding all said sections to each other, while said securing elements are in position, by continuous fluid tight welds after said tank has been completely erected.

2. The method of making a fluid tight tank bottom, comprising bolting together the lapped margins of lapped sheet metal sections in fixed face to face relation, and only welding the edges of the overlapping sections to the top surface of the underlapping sections at the laps in said bottom in fluid tight relation and welding the bolts and nuts in fluid tight relationship to each other and to the overlapping sections, said welding being all done on the upper side of said bottom and subsequent to completion of the bolting of all the sections of said bottom together and in any desired order.

3. The method of making a fluid tight tank bottom, comprising lapping the margins of sheet metal sections of said bottom having perforations adjacent the marginal edges thereof, with said perforations in alignment, inserting bolts in said aligned perforations of the lapped sections from the under side of said bottom, applying nuts to said bolts from the upper side of said bottom and tightening the same down into position to clamp the lapped portions of said sections in intimate, fixed, face to face engagement, and welding only the edges of the overlapping sections to the top surface of the underlapping sections at the laps in said bottom and welding the nuts and bolts in fluid tight relationship to each other and welding the nuts in fluid tight relationship to the overlapping sections, said welding being all done subsequent to the completion of the bolting of all the sections of said bottom together and in any desired order.

4. In the method of making a welded tank having a bottom and a vertical side wall, firmly securing the sections of the bottom in fixed relation to each other, securing firmly in fixed relation to said bottom and to each other the sections of a ring of the side wall of said tank by bolting outturned flanges on said side wall sections in face to face engagement with the margin of said bottom and bolting the margins of circumferentially adjoining sections of said side wall to each other in lapped relation and subsequently welding the engaging portions of all said sections to each other in any convenient order while so secured.

5. In the method of making a welded tank having a bottom and a vertical side wall, firmly securing the sections of the bottom in fixed relation to each other, securing firmly in fixed relation to said bottom and to each other the sections of a ring of the side wall of said tank by bolting outturned flanges on said side wall sections in face to face engagement with the margin of said bottom and bolting the margins of circumferentially adjoining sections of each side wall ring to each other in lapped face to face relation, securing the sections of another ring of said side wall firmly in fixed relation to the sections of said first mentioned ring and to each other by bolting outturned flanges of the sections of the adjoining rings to each other in face to face engagement and the margins of circumferentially adjoining sections of said second ring in lapped face to face relation and subsequently welding the engaging portions of all said sections to each other in any convenient order while so secured.

6. In the method of making a welded tank having a bottom and having a vertical side wall reinforced by circumferential outwardly directed stiffening flanges, firmly securing preformed, curved, flanged, sheet metal sections of the lowermost ring of said side wall in fixed relation to the margin of the bottom and to each other by bolting outturned flanges of said sections in face to face engagement with the margin of the bottom and the margins of circumferentially adjoining sections of said ring to each other in lapped face to face relation and successively firmly securing the sections of any desired number of rings of preformed, curved, flanged sheet metal sections in fixed relation to the sections of the next lower ring and to each other by bolting outturned flanges of the sections of each successive ring in face to face engagement with outturned flanges of the next lower ring and the margins of the circumferentially adjoining sections of said ring to each other in lapped face to face relation, and subsequently welding the engaging portions of said sections to each other in any convenient order while so secured.

7. In the method of making a tank having a vertical side wall and an integrally welded integrally reinforced deck, firmly securing a plurality of segmental sheet metal deck sections each having a depending integral flange along one radial edge thereof to each other and to an outwardly directed flange on the side wall and to a central support by bolting the ends of said sections to said flange and central support and an unflanged radial marginal portion of each section in overlapping relation to a flanged radial marginal portion of an adjoining section, and welding said sections to each other and to said central support and said outwardly directed flange in any desired order after all said sections have been bolted in position.

8. In the method of making a tank having a vertical side wall and a deck, firmly securing a plurality of segmental sheet metal deck sections to each other and to an outwardly directed marginal flange on the side wall and to a central support by bolting the ends of said sections in face to face engagement with said flange and central support and a radial marginal portion of each section in overlapping face to face relation with a radial marginal portion of an adjoining section, and welding said sections to each other and to said central support and said outwardly directed flange in any desired order after all said sections have been bolted in position.

ANDREW A. KRAMER.